United States Patent
Wain

(10) Patent No.: US 7,726,739 B2
(45) Date of Patent: Jun. 1, 2010

(54) SEAT STRUCTURE

(75) Inventor: Robert Wain, Derby (GB)

(73) Assignee: Kongsberg Automotive Ltd, Burton-on-Trent (GB)

( * ) Notice: Subject to any disclaimer, the term of this patent is extended or adjusted under 35 U.S.C. 154(b) by 11 days.

(21) Appl. No.: 11/718,346

(22) PCT Filed: Nov. 17, 2005

(86) PCT No.: PCT/GB2005/004423

§ 371 (c)(1),
(2), (4) Date: Dec. 6, 2007

(87) PCT Pub. No.: WO2006/054078

PCT Pub. Date: May 26, 2006

(65) Prior Publication Data

US 2008/0191532 A1 Aug. 14, 2008

(30) Foreign Application Priority Data

Nov. 19, 2004 (GB) .................................. 0425563.4

(51) Int. Cl.
*A47C 7/14* (2006.01)

(52) U.S. Cl. .............................. 297/284.9; 297/284.11

(58) Field of Classification Search .............. 297/284.9, 297/284.11

See application file for complete search history.

(56) References Cited

U.S. PATENT DOCUMENTS

| 4,652,049 A | * | 3/1987 | Maruyama et al. | ..... | 297/284.11 |
| 4,664,444 A | * | 5/1987 | Murphy | ................ | 297/284.11 |
| 4,775,185 A | * | 10/1988 | Scholin et al. | ......... | 297/284.11 |
| 5,015,031 A | | 5/1991 | Horenkamp et al. | | |
| 5,082,326 A | | 1/1992 | Sekido et al. | | |
| 5,697,672 A | * | 12/1997 | Mitchell | ............. | 297/284.11 X |
| 6,056,360 A | | 5/2000 | Schneider | | |

(Continued)

FOREIGN PATENT DOCUMENTS

DE 87 06 856 7/1987

(Continued)

*Primary Examiner*—Rodney B White
(74) *Attorney, Agent, or Firm*—Steven M. Jensen; Edwards Angell Palmer & Dodge LLP

(57) ABSTRACT

A seat structure comprises a base (1), a back and a bolster (2) located on at least one edge of the base or back. The bolster (2) includes an upholstered cover (3) and a support structure (4) for controlling the position of the upholstered cover (3). The support structure (4) comprises: a support member (11) pivotally mounted for pivotal movement between a raised position in which the support member (11) supports the upholstered cover (3) in a raised state, and a lowered position in which the upholstered cover (3) is no longer supported in the raised state, a first strut member (14) pivotally connected to the support member (11) and a second strut member (16) pivotally connected to the first strut member (14) to form with the first strut member (14) an over-centre strut (13) which, when in its over-centre configuration, holds the support member in its raised state. Inflatable bladders (19, 20) are provided on opposing sides of the over-centre strut (13) and can be inflated in order to engage against the over-centre strut (13) and move it passed it trip position, thereby moving the support member (11) between its raised and lowered positions.

12 Claims, 3 Drawing Sheets

U.S. PATENT DOCUMENTS

| | | | |
|---|---|---|---|
| 6,068,336 A * | 5/2000 | Schonauer | 297/284.9 |
| 6,386,631 B1 * | 5/2002 | Masuda et al. | 297/284.11 X |
| 6,419,317 B1 * | 7/2002 | Westrich et al. | 297/284.11 |
| 7,093,897 B2 * | 8/2006 | Terrand et al. | 297/284.11 |
| 7,131,695 B2 * | 11/2006 | Hofschulte et al. | 297/284.9 |
| 7,140,681 B2 * | 11/2006 | McMillen | 297/284.9 |
| 7,404,602 B2 * | 7/2008 | Okada et al. | 297/284.11 |
| 2004/0070247 A1 * | 4/2004 | Rhein | 297/284.9 |
| 2007/0057551 A1 * | 3/2007 | Lachenmann et al. | 297/284.9 |

FOREIGN PATENT DOCUMENTS

| | | |
|---|---|---|
| DE | 196 05 892 | 8/1997 |
| GB | 878 022 A | 9/1961 |
| GB | 2 403 139 | 12/2004 |

* cited by examiner

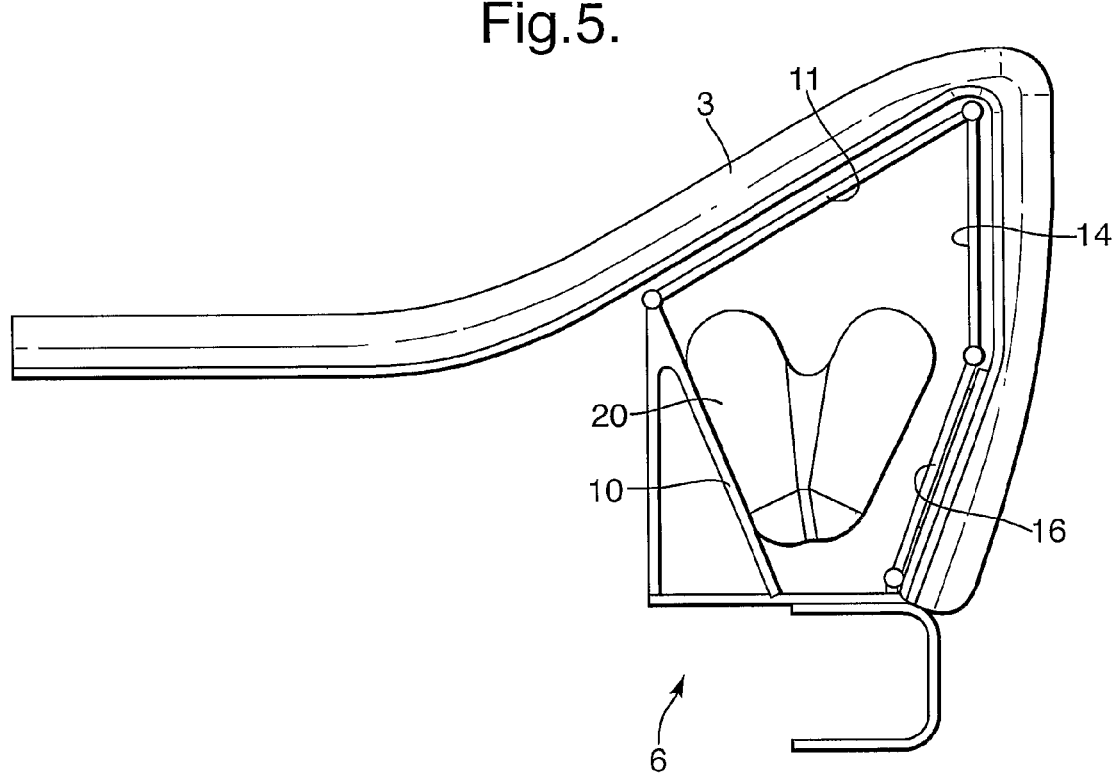

SEAT STRUCTURE

This invention relates to a seat structure, and more particularly to a seat structure having a collapsible bolster. The bolster may be on the seat base or the seat back, and may be present on any or all of the three free edges of the seat base or back. The preferred embodiment of the invention finds particular application as a vehicle seat, but the invention is not limited to such applications.

For user comfort it is often desirable for the edge regions of a seat base or seat back to be raised relative to the central region thereof to form a bolster. Such bolstering is commonly used on the bases and backs of vehicle seats. Whilst the bolsters add to comfort and body control when the vehicle is in use, they represent somewhat of an inconvenience for those getting into and out of the vehicle since they represent a raised ridge over which the person entering or leaving the vehicle must pass in order to get onto or off (as the case may be) the main part of the seat. The problem is particularly acute for those trying to get out of the driver's seat of a car which has significant side bolsters and a relatively low seat platform.

The present invention provides a seat in which the bolster is readily collapsible.

According to a first aspect of the present invention there is provided a seat structure comprising a base and a back and a bolster at least one edge of the base or back, the bolster including an upholstered cover and a support structure for controlling the position of the upholstered cover, the support structure comprising: a support member pivotally mounted for pivotal movement between a raised position in which the support member supports the upholstered cover in a raised state, and a lowered position in which the upholstered cover is no longer supported in the raised state; a first strut member pivotally connected to the support member; a second strut member pivotally connected to the first strut member to form with the first strut member an over-centre strut which, when in its over-centre configuration, holds the support member in its raised state; and actuator means for tripping the over-centre strut from its over-centre position to allow the support member to move from the raised position to the lowered position.

With the arrangement in accordance with the invention the raised state of the bolster is normally maintained by the over-centre strut. Such an arrangement requires no continuing intervention—in other words, the raised state is maintained without having to maintain, for example, air pressure within a bladder. The over-centre strut arrangement provides a strong mechanical support which will continue to maintain the bolster in its raised condition until action is taken to trip the over-centre strut out of its over-centre position. At this point the support member can immediately fall allowing the bolster to collapse. Because only a very small movement of the over-centre strut is required in order to trip it from its stable over-centre position to a position in which it is unable to maintain the support member in the raised position, collapse of the bolster can be effected rapidly. Collapse of the bolster may be controlled automatically, for example in response to opening a door of the vehicle located adjacent the seat in question.

Preferably, the means for tripping the over-centre strut comprises an inflatable bladder which is supplied with compressed air from a suitable reservoir or pump in order to trip the over-centre strut.

Preferably, a powered actuator is provided for moving the support member from its lowered to its raised position, and for moving the over-centre strut into its over-centre position. Such powered actuator may comprise an inflatable bladder. When an inflatable bladder is provided as a powered actuator, means are preferably provided for interrupting the supply of air to the bladder as soon as the support member is fully raised and the over-centre strut has been tripped into its over-centre position. Accordingly, once the bladder of the powered actuator has performed its function of restoring the bolster to its raised configuration it is able to collapse so that it does not inhibit subsequent tripping of the over-centre strut out of its over-centre position in order to collapse the bolster.

Preferably, the over-centre strut is supported, in its over-centre configuration, by an abutment member which forms part of the seat frame. Preferably, the support member and the second strut member are pivotally connected to the seat frame.

The above and further features and advantages of the invention will become clear from the following description of a preferred embodiment thereof, given by way of example only, reference being had to the accompanying drawings wherein:

FIG. 5 is a view corresponding to FIGS. 2-4 illustrating the bolster immediately after the over-centre strut has tripped into its over-centre position following raising of the bolster.

Figure 1:
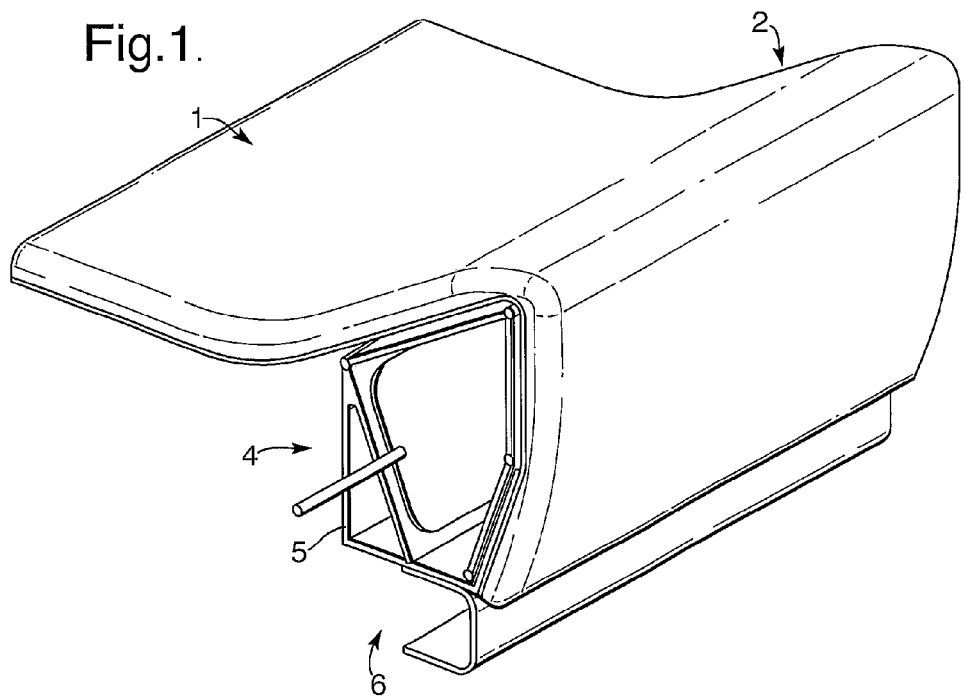
FIG. 1 is an isometric view of part of the seat assembly broken away to illustrate the construction of the bolster region thereof.

Referring firstly to FIG. 1 there is shown an isometric view of part of a seat. The part shown is a seat base 1 which has a raised bolster 2 located at one edge thereof. Typically, the seat may be the seat of an automobile and the bolster 2 may be provided at the edge of the seat base 1 immediately adjacent an opening door. The bolster includes an upholstered cover 3 and a support structure 4 for controlling the position of the upholstered cover. The support structure 4 comprises a rigid base 5 which forms part of the seat frame 6. The base 5 itself comprises a bottom rail 7, an inner side 8, an outer side 9 and a sloping wall 10. The sloping wall 10 extends from the upper end of the inner side 8 to approximately the middle of the bottom rail 7. The base 5 may be fabricated from any suitable material, for example as an extrusion or a metal pressing.

A support member 11 is connected by a pivotal connection 12 to the upper end of the inner side 8. In the position illustrated in FIGS. 1 and 2 the support member 11 is in a raised position in which it supports the upholstered cover 3. During normal use of the seat the support member 11 will be maintained in the illustrated raised position by an over-centre strut 13 formed by a first strut member 14 which is connected by a pivotal connection 15 to the support member 11, and a second strut member 16 which is connected by a first pivotal connection 17 to the first strut member 14 and by a second pivotal connection 18 to the base 5. In the over-centre position illustrated in FIGS. 1 and 2 the second strut member 16 is supported by the outer side 9 of the base 5 and is unable to rotate further in the clockwise direction. Downward loading imposed by the support member 11 on the first strut member 13 via the pivotal connection 15 will accordingly be transferred to the base 5 and the components will remain in the illustrated position indefinitely.

Figure 2:
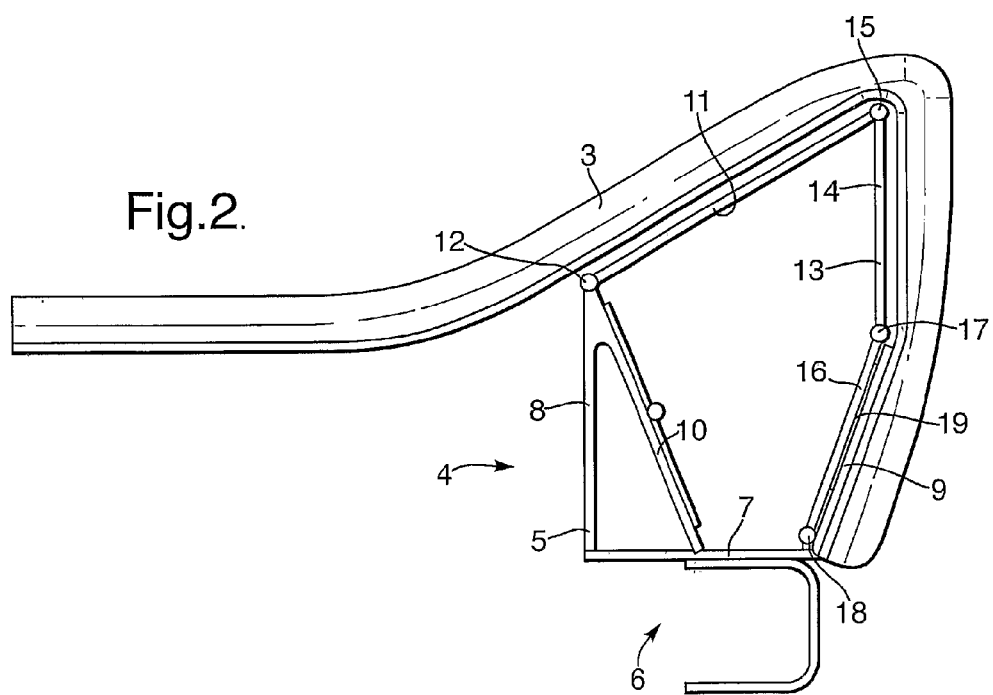
FIG. 2 is a side view corresponding to FIG. 1 showing the bolster in its raised position.
Figure 3:
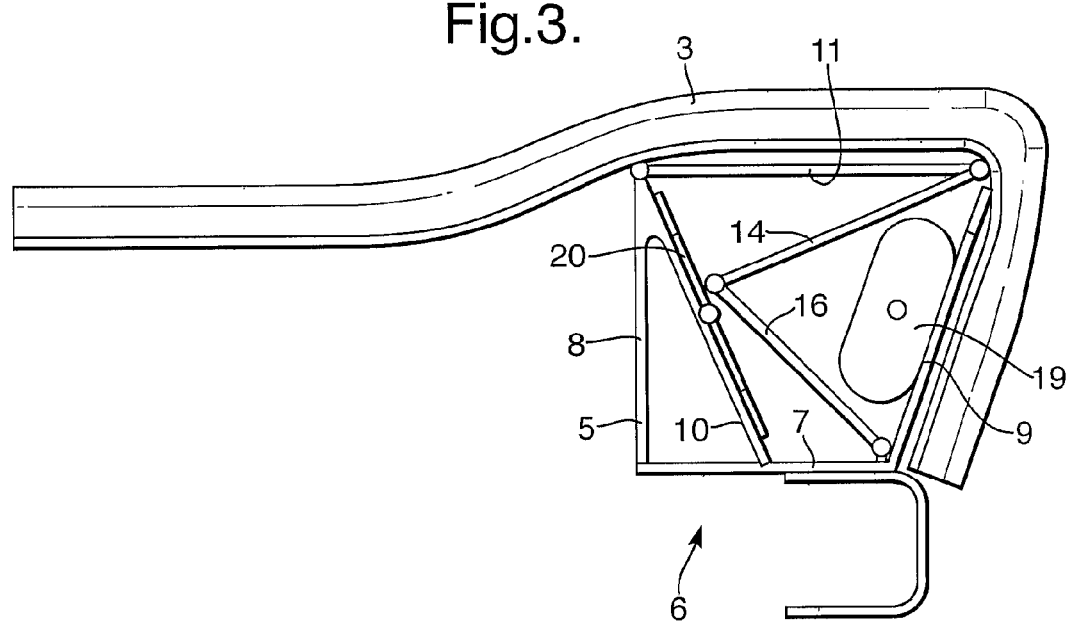
FIG. 3 is a view corresponding to FIG. 2 showing the bolster in its lowered configuration.

The bolster may be moved from the raised position illustrated in FIGS. 1 and 2 to the lowered position illustrated in FIG. 3 by tripping the over-centre strut 13 away from its over-centre position. This is accomplished by moving the pivotal connection 17 so that it lies to the left (as viewed in FIG. 2) of a straight line connecting the pivot connection 15 to the pivot connection 18. It will be noted from FIG. 2 that only a relatively small displacement of the pivotal connection 17 is necessary in order to achieve this tripping. In the invention, actuator means are provided for tripping the over-centre strut out of the stable configuration illustrated in FIG. 2 to enable the bolster to collapse into the configuration illustrated in FIG. 3.

In the illustrated embodiment of the invention the actuator means comprises a bladder 19 which is mounted on the inner surface of the outer side 9. When the various components are in the configuration illustrated in FIG. 2 the bladder 19 is fully collapsed and is sandwiched between the outer side 9 of the base 5 and the second strut member 16. A relatively small inflation of the bladder 19 will shift the second strut member 16, and accordingly the position of the pivotal connection 17, to the left as illustrated in FIG. 2. Accordingly a relatively small inflation of the bladder will be necessary in order to trip the over-centre mechanism into its released configuration thereby allowing the bolster to collapse into the configuration shown in FIG. 3. This configuration makes it far easier for a user to leave the seat than when the bolster is in the raised configuration illustrated in FIGS. 1 and 2.

It is envisaged that once the bladder 19 has been inflated to an extent sufficient to ensure tripping of the over-centre strut, the bladder can either be disconnected from a supply of compressed air so that pressure will bleed away from the bladder naturally, or can be connected to an extractor so as to empty the bladder completely ready for re-tripping of the over-centre strut.

Figure 4:
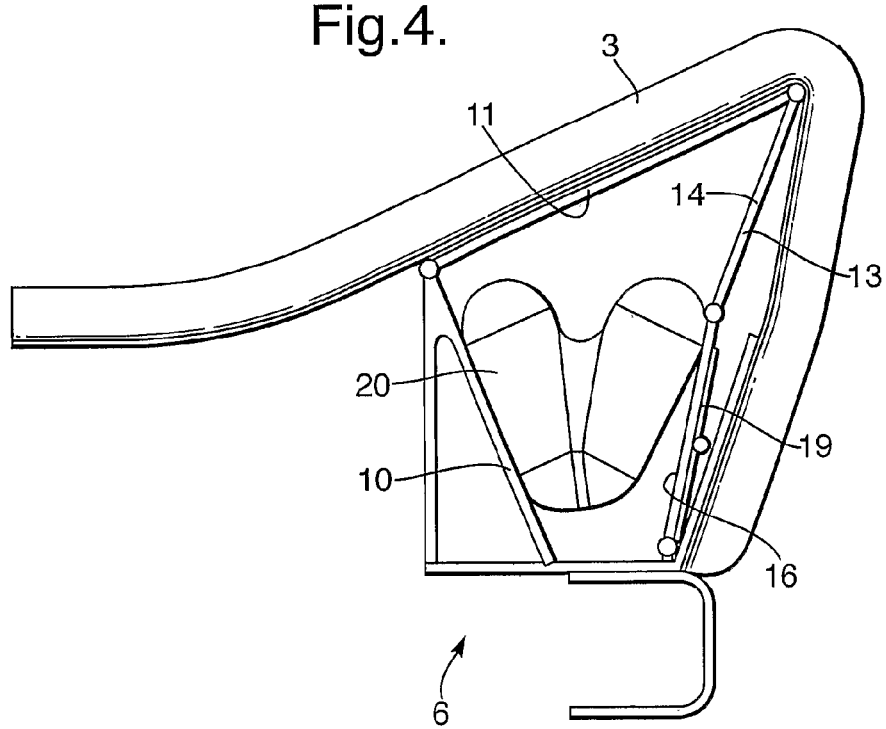
FIG. 4 is a view corresponding to FIGS. 1 and 2 showing the action of raising the bolster.

When it is desired to re-establish the bolster to its raised configuration, a bladder 20 which is mounted on the outer face of the sloping wall 10 is inflated so as to act on the over-centre strut 13 and, in turn, to raise the support member 11. In the configuration illustrated in FIG. 4 the bladder 20 has been inflated to the extent that the over-centre strut 13 is about to flip over into its stable over-centre position. It will be noted that the bladder 19 is at this point fully deflated. A small further inflation of the bladder 20 will move the components into the configuration illustrated in FIG. 5. The bladder 20 may then be deflated either by allowing the air within it to bleed away or by evacuating it, to return the components to the configuration illustrated in FIGS. 1 and 2.

It should be noted that although in the preferred embodiment of the invention the actuators provided both for tripping the over-centre strut out of its stable over-centre position, and for re-establishing the bolster in its raised configuration, are air inflated bladders, other arrangements are possible. For example, under certain circumstances pneumatic piston and cylinder arrangements or electrical actuators may be used.

It should also be noted that whilst the invention has been described in the context of the edge region of a seat base, the invention is equally applicable to the edge region of a seat back.

The above described arrangement can be implemented using a particularly simple connection arrangement if a reversible pump having connections at its inlet and outlet is available. Such pumps can be implemented simply in the form of a rotating vane arrangement driven by a small electric motor. The two connections to the pump (each of which will serve as an inlet or an outlet depending on the direction of pump rotation) are connected respectively to the bladders 19 and 20. Accordingly, when the pump is rotating in one direction air is extracted from the bladder 20 and pumped to the bladder 19 (to collapse the bolster), and when the pump is rotated in the opposite direction air is extracted from the bladder 19 and added to the bladder 20 in order to erect the bolster. A suitable leakage path is provided for ensuring that the pump is still able to deliver air even when the bladder connected to the suction side of the pump has fully deflated.

The invention claimed is:

1. A seat structure comprising a base, a back and a bolster located on at least one edge of the base or back, the bolster including an upholstered cover and a support structure for controlling the position of the upholstered cover, the support structure comprising:
   a support member pivotally mounted in the support structure for pivotal movement between a raised position in which the support member supports the upholstered cover in a raised state, and a lowered position in which the upholstered cover is no longer supported in the raised state;
   a first strut member pivotally connected to the support member;
   a second strut member pivotally connected to the first strut member to form with the first strut member an over-centre strut, wherein an over-centre position of the over-centre strut, the first and second strut members are fully extended so as to hold the support member in the raised state; and
   actuator means for tripping the over-centre strut from the over-centre position to allow the support member to move from the raised position to the lowered position.

2. A seat structure according to claim 1, wherein said actuator means comprises at least one powered actuator which operates to trip said over-centre strut from the over-centre position in order to move the support member between the raised and lowered positions.

3. A seat structure according to claim 2, wherein said actuator means comprises two powered actuators provided on opposite sides of the over-centre strut, one actuator being operable to press against said over centre strut in order to trip it from the over-centre position and the other actuator being operable to press against said over centre strut in order to trip it into the over-centre position.

4. A seat structure according to claim 2 or claim 3, wherein the at least one powered actuator is an inflatable bladder.

5. A seat structure according to claim 4, further including means for interrupting the supply of air to the bladder as soon as the over-centre strut has been tripped from the over-centre position.

6. A seat structure according to claim 4, further including means for deflating the bladder as soon as it has operated to trip the over-centre strut from the over-centre position.

7. A seat structure according to claim 1, further including an abutment member which forms part of the seat structure and which supports the over-centre strut in the over-centre configuration.

8. A seat structure according to claim 1, wherein the support member and the second strut member are pivotally connected to the seat structure.

9. A seat structure for a vehicle seat, comprising:
   a support member pivotally mounted in a support structure of the seat structure for pivotal movement between a raised position in which the support member supports the upholstered cover in a raised state, and a lowered position in which the upholstered cover is no longer supported in the raised state;
   a first strut member pivotally connected to the support member;
   a second strut member pivotally connected to the first strut member to form with the first strut member an over-centre strut which, when in an over-centre position, holds the support member in the raised state; and two powered actuators provided on opposite sides of the over-centre strut, one actuator being operable to press against the over-centre strut in order to trip it from the over-centre position and the other actuator being operable to press against the over-centre strut in order to trip it into the over-centre position.

10. The seat structure according to claim 9, wherein the powered actuators are inflatable bladders.

11. A seat structure for a vehicle seat, comprising:

a support member pivotally mounted in a support structure of the seat structure for pivotal movement between a raised position in which the support member supports the upholstered cover in a raised state, and a lowered position in which the upholstered cover is no longer supported in the raised state;

a first strut member pivotally connected to the support member;

a second strut member pivotally connected to the first strut member, the first and second strut members configured to form an over-centre strut which, in an over-centre position, holds the support member in the raised state; and at least one inflatable bladder provided for tripping the over-centre strut from the over-centre position to allow the support member to move from the raised position to the lowered position.

12. The seat structure of claim 11, wherein the at least one inflatable bladder comprises two inflatable bladders provided on opposite sides of the over-centre strut, one actuator being operable to press against the over-centre strut in order to trip it from the over-centre position and the other actuator being operable to press against the over-centre strut in order to trip it into the over-centre position.

* * * * *